United States Patent
Thomason et al.

[11] 3,980,130
[45] Sept. 14, 1976

[54] HEAT, COLD AND DRY STORAGE

[76] Inventors: Harry E. Thomason; Harry Jack Lee Thomason, Jr., both of 6802 Walker Hill Road, SE., Washington, D.C. 20027

[22] Filed: Dec. 21, 1973

[21] Appl. No.: 427,312

Related U.S. Application Data

[63] Continuation-in-part of Ser. No. 317,764, Dec. 22, 1972.

[52] U.S. Cl. ................................. 165/18; 126/271; 126/400; 165/48; 165/50; 165/104 S
[51] Int. Cl.² ......................................... F24D 11/00
[58] Field of Search ................ 165/1, 2, 4, 18, 104, 165/49, 50, 48; 126/400, 271

[56] References Cited
UNITED STATES PATENTS

| | | | |
|---|---|---|---|
| 2,083,732 | 6/1937 | Moore et al. | 165/4 |
| 2,713,252 | 7/1955 | Jackson et al. | 165/18 |
| 3,254,702 | 6/1966 | Thomason | 165/104 |
| 3,262,493 | 7/1966 | Hervey | 165/18 |

*Primary Examiner*—Charles J. Myhre
*Assistant Examiner*—Daniel J. O'Connor

[57] ABSTRACT

A storage bin may be used in many ways during the year such as: storage of solar-produced heat during the winter; storage of cold during the summer obtained from nighttime cold-producing apparatus or solar cooling apparatus; storage of heat and cold simultaneously for variable autumn and springtime weather, storage of dryness to absorb excess moisture on hot humid days, and so on. The present invention includes a number of features regarding storage of "heat" and "cold" (technically, storage of heat at higher and lower temperature levels). One of the important features is use of the air conditioner compressor for its normal chilling, drying function during the hot summer, using it as a "heat pump" during variable autumn and spring weather to heat one bin while chilling another, and using it as an auxiliary heat source for long cloudy spells during the winter when solar energy is not adequate, thereby eliminating the furnace.

Dry air passing through the system during the winter may be humidified as needed to keep the home from feeling so dry and cold. And, the heat or cold may be supplied to various zones of the home, winter or summer.

12 Claims, 3 Drawing Figures

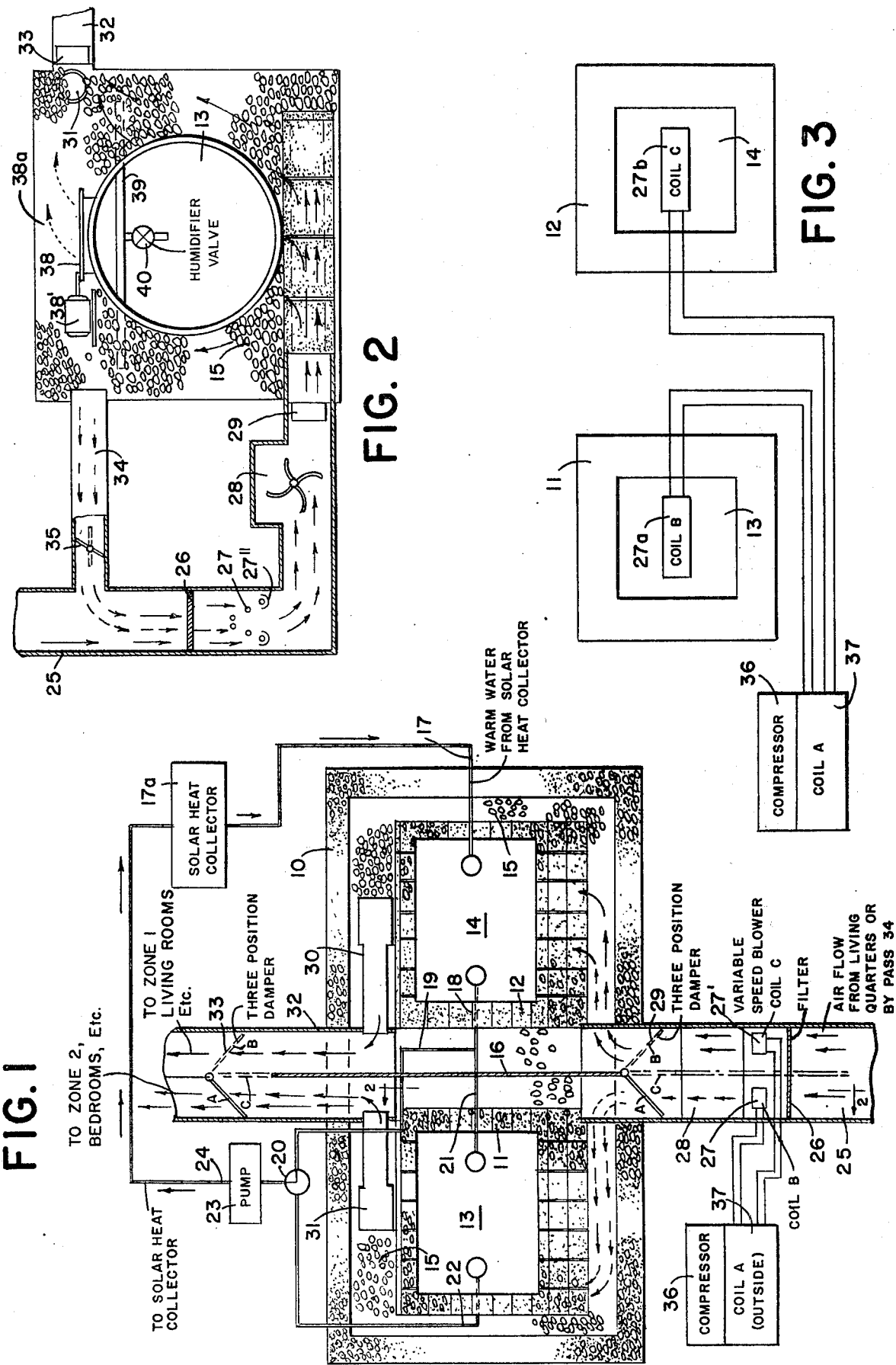

HEAT, COLD AND DRY STORAGE

INTRODUCTION AND BRIEF SUMMARY

This application is a continuation-in-part of Ser. No. 317,764, filed Dec. 22, 1972, by Harry E. Thomason and Harry Jack Lee Thomason, Jr.

The invention is described as related to home heating and cooling although it obviously could be applied to space heating and cooling of other types of buildings, and so on. Technically there is no such thing as "cold", only heat at a high temperature level, usually referred to as heat, and heat at a lower temperature level, often referred to as "cool" or "cold". However, the terms "cool" and "cold" have taken on a meaning in everyday language. Although difficult to define the terms, "cold storage," "production of cold" for air conditioning, and so on are believed to be easier to understand than technical terms such as producing and storing "heat at a low temperature level" to keep a home or building cool. Therefore the disclosure and claims refer to cool, cold, cold storage, etc. in their popular usage, so that, hopefully, even the layman can understand the invention, even though the terms are technically incorrect.

A number of solar heated and air conditioned houses are now in use, or under constructon, or licensed for use of Thomason inventions, for example, solar heat collectors such as in U.S. Pat. Nos. 3,145,707, 3,215,134 and 3,387,602; storage apparatus such as in U.S. Pat. Nos. 3,254,702 and 3,369,541; cold-dry producing apparatus as in U.S. Pat. No. 3,812,903. by Harry E. Thomason. In application Ser. No. 317,764 Applicants teach the use of two (or more) storage containers. They are used for storing heat at two levels at the same time (warm and cool), or for storage of heat in both containers, or for storage of coolness in both containers. Preferably the main source of heat is solar energy and the source of coolness (and dryness) is an air conditioning compressor although other sources could be used for either, or both. The compressor is operated during the hot summertime, primarily at night. Therefore it saves electricity by producing more coldness and dryness during the cool night hours. That also reduces electrical power consumption during hot afternoons when brownouts and blackouts are caused by air conditioning compressors.

In the present invention the air conditioning compressor serves the functions set out above, and more, as follows.

1. During the winter the compressor serves as a heat pump to provide auxiliary heat when solar heat is inadequate. Therefore it eliminates the need for a furnace for a back-up heating system.
2. Further, during winter, in another mode of operation, the compressor serves as a heat pump to pump heat from the low temperature container to the high temperature container. That yields dual desirable results:
    A. First, fluid from the low temperature container is circulated to the solar heat collector and that low temperature fluid picks up heat with increased efficiency of solar heat collection;
    B. Second, the warmer container provides more heat for the home per minute of operation. Therefore the blower does not have to operate as much of the time. The net result is that more of the total heat load for the building is supplied by Solar Energy.
3. Still further, during variable springtime and autumn weather, the compressor keeps one container charged with heat while the other is charged with coldness, or coldness and dryness. Therefore, for chilly days or cold nights out-of-season, stored heat is available from the warm container. Similarly, for warm or warm muggy days out-of-season, stored coldness, or coldness and dryness are avilable from the cool container.

The invention not only dehumidifies the air and stores dryness during hot muggy summer weather but also avoids a dry chilly home during the winter by providing for humidification of the air to reduce that stuffed-up dry cold feeling of discomfort in the home. The air, humidified at substantially no extra cost for energy or humidifying equipment, keeps furniture, paint, etc. from cracking and deteriorating because the air is not dried out, and it is not hot near air registers as in homes heated by hot air furnaces, radiators, electric heat, etc.

IN THE DRAWING

FIG. 1 is a diagrammatic illustration of a plan view of the invention;

FIG. 2 is a diagrammatic illustration substantially along line 2—2 of FIG. 1.

FIG. 3 is a diagrammatic illustration of a modification.

Heat of cold storage apparatus 10 comprises two or more compartments 11, 12 with liquid storage containers or tanks 13, 14 and stones, containers of heat-of-fusion storage material, or other illustrated at 15. A wall 16, of insulating material, is preferably constructed between the compartments.

Warm liquid, from a solar heat collector 17a for example, or other source of heat flows into tank 14, near its top, by way of conduit 17 and flows out, from near its bottom, by conduit 18. From 18 the liquid may pass though line 19 directly to valve 20, or may flow through line 21 to near the top of tank 13 and thence, from near the bottom, through line 22 to valve 20. Pump 23 draws liquid from tank 14 or tank 13, depending on the setting of valve 20, and sends the liquid through line 24 to a solar heat collector 17a or other source of heat such as off-peak heat producing equipment, a heat pump, or other.

Air from spaces to be heated or cooled is drawn, by blower 28, in at 25 through filter 26 and heating-cooling coils B and C (27 and 27'). Moisture condensing out of the air drips into condensate troughs 27" from whence it drains, is pumped, or otherwise, preferably over to outside coil A to help cool it when it runs as a hot coil. Blower 28 is preferably one of the multi-speed, multi-capacity type. Air from blower 28 passes multi-position damper 29 and enter the storage compartments as follows. With damper 29 in position A, the air flow is directed to compartment 12, or in position B the air flows to compartment 11, or in position C the air flows to both compartments.

The air flows through one or both of compartments 11 and 12 where it is warmed (or cooled) and passes out through ducts 30, 31 and 32. Multi-position damper 33 may be set in position A to direct the warmed or cooled air primarily to Zone 1; for example, the living room, dining room and kitchen of a home. Or, damper 33 may be set in position B to direct the air to Zone 2, the bedrooms of a home for example. Or, damper 33 may be set in position C to allow the air to flow to both Zones.

For convenience of illustration multi-position pivoted dampers 29 and 33 are shown and described. However, multi-position rotary or sliding dampers could be used. A damper in branch 30 and another in branch 31 could be used. Either damper could be opened to permit air to flow to duct 32 and thence to Zone 1 or to Zone 2. Or, both could be opened for air flow to either or both Zones. If desired two dampers could be used to replace damper 29. Any of the dampers may be automatically power operated, or manually operated as desired. Some of the damper settings could remain the same for months, such as an entire heating or cooling season. Therefore, automatic power operation may be dispensed with if desired in the interest of lower cost and simplicity.

Bypass line 34 and damper 35 permit recirculation of air at times. For example, during the cooling cycle the air may be recirculated at times through coil 27 (B), or through both coils 27 and 27' (B and C) for further cooling and dehumidification of the materials in the storage compartment or compartments. (Of course if air is to be recirculated through one coil only, say coil B only, then a bypass and damper must be provided for that "side" of the apparatus. If desired a similar bypass and damper may be provided for the other side and Coil C.) Whether using one side or both sides the apparatus permits greater storage of "coolness" and "dryness" at times when there is very little or no need for cooling of the home, such as late at night during chilly hours near dawn. As another example, during the heating cycle, the air may be recirculated through coils 27 and 27' operating as hot coils, with compressor 36 pumping heat in from 37 (coil A) operating as a cold coil. This could be operation during "warm" winter days for keeping the home warm on cold winter nights when stored heat is needed in large quantities. As still another example, during cloudy periods, at night, etc., heat can be pumped from coil B (27), operating as a cold coil, to coil C (27') operating as a hot coil; this cools container 11 while warming container 12 to provide additional heat for the home. Then, cooled liquid from tank 13 is more efficient for picking up heat from the solar heat collector when the sun begins to shine. As still another example, during variable spring and autumn weather, container 11 may be kept cold and dry to supply coldness and dryness to the home on hot muggy days out of season while container 12 is kept warm to supply heat during cold snaps out of season. Of course free heat from the sun is usually available if the system is used in conjunction with a solar heat collector. Therefore, the heat pumped out from cold coil B (27) could be discharged through Coil A (37) instead of Coil C (27') if desired.

It should be noted that air flow though coils B (27) and C (27') is downwardly. This is an important feature when one or both are operating as cold coils to cool and dehumidify. As the Thomasons explain in U.S. Pat. No. 3,812,903, and their book titled "Solar House Heating and Cooling Systems — Comparisons — Limitations," the moisture condensing out of the coils is whisked out by the combined downward force of gravity plus downward air flow. That keeps the coils from becoming wet and clogged with water as often happens when air is blown upwardly as in most home furnace-air conditioning combinations. By keeping the coils dry and un-clogged the air is dried and cooled with greater efficiency. Also, the air flows more freely, thereby eliminating back pressure and wasted power trying to force air through partially clogged "wet" coils. The air moves faster through the home, thereby making it feel cooler. And, when operating at night, the cool night air takes heat away from coil A faster, resulting in colder coils B and C, with even more dehumidification as well as greater efficiency of the system for cooling and drying.

A manhole or other opening may be provided at 38. A motor device 38' may be used, if desired, to open and close a cover as described below. A humidifier at 39, such as a spray pipe or drip pipe may be controlled by humidifier valve 40. Then, during dry cold winter weather moisture may be added to the air through storage material 15 by opening valve 40 to permit water or pleasant smelling liquid to drip from tank 13 or 14 or both as desired. If desired liquid or perfumed fluid with the aroma of roses or orchids could be supplied to pipe 39 from a source outside of tank 13 or outside of container 11. That humidifies the home air and adds a sweet smell to the home air. The warm moist air feels warmer than dry air and reduces discomfort due to dry stuffed-up noses. Valve 40, or cover 38 as operated by motor device 38', or both, may be opened and closed automatically by a humidostat. That allows liquid or vapor 38a to enter the air flowing through the container(s) in a manner as will be obvious to those skilled in the art. If precise control of humidity is not desired then manhole cover or covers 38 may be left off, or partially off, to allow moisture from the liquid to escape into the air flowing through the bin. As the water is warmed the water is vaporized faster. Conversely, as the water is chilled, very little water vapor escapes. That automatically adds more humidity during cold weather when solar energy, or heat from coil B or coil C, or both, warm the water. And it automatically reduces humidification during hot weather when the tanks and water are being chilled. If desired the size of the opening at 38 may be increased for more humidification and closed or reduced for less. The opening (or openings) may be uncovered during the winter when humidification is desired and may be covered during the summer if too much moisture is escaping despite the fact that the water is cold inside.

In FIG. 3 Coil B (27a) is preferably placed in tank 13 while Coil C (27b) is preferably placed in tank 14 to chill the contents, or to heat the contents, or to heat the contents of one while cooling the contents of the other. That, in turn, chills or warms containers 11 and 12 in a manner somewhat as described above. However, if dehumification is desired in the cold container 11 then provision is preferably made for the condensate to drain or be removed from that cold storage container.

In FIGS. 1 and 2 heat and cold from Coil B (27) and Coil C (27') are fed directly, by the flowing air stream, to the storage containers 11 and 12. In that manner much of the heat, or cold, or both, is stored as it is being produced. The heat or cold that is produced passes into bins 11, 12 where much of it is absorbed and the remainder (with damper 35 closed) is directed to the living quarters of the home, or other space to be heated or cooled. That results in heating or cooling of the home but at a fairly slow rate. At times it may be desirable to obtain quick heating or cooling (e.g. when a family returns home on a cold day after a vacation trip.) If desired a storage bin bypass, or two, could be installed, bypassing container 11, or container 12, or both. It should preferably be connected downstream from the blower (or blowers) 28 adjacent to damper 29, and running directly to outlet 32. A damper in the bypass, (or dampers in the bypasses) could be opened to permit direct use of the heat, or cold, or both, instantly, for quick heating or cooling of the living quarters. The dampers would be closed for normal use, while heat (or cold) is being stored or recovered from storage. Inasmuch as this type of operation would be infrequent and perhaps never used in some homes, the damper(s) could be manually operated for simplicity and low-cost.

If desired container 11, including tank 13, could be replaced by a swimming pool. Low temperature heat could be used for pool heating and a high temperature heat stored away for warming the home or other space to be heated. Other uses for the low temperature heat will be obvious to those skilled in the art.

MODES OF OPERATION

1. FULL WINTER HEATING

Set dampers 29 and 33 in positon C and set valve 20 to draw liquid from line 22. Cold water is pumped from tanks 13 and 14 in tandem to solar heat collector 17a where it is warmed. It returns through line 17 to tank 14, and thence to tank 13. The warmed tanks of water, and warmed stones therearound, contain large quantities of stored heat and large areas of heat exchange surfaces. This stored heat warms the air being blown out to the living quarters to keep the home warm on nights and cloudy days when the sun does not shine. If desired, damper 33 may be left in position C full time to warm all of the home full-time. Or, it may be swung to position A to primarily warm the Zone 1 rooms during the day and to position B to primarily warm the Zone 2 rooms at night. (With typical loose-fitting dampers, etc. some leakage will occur to warm all of the home to some extent even though Zone 1 or Zone 2 is the primary Zone being warmed.) The blower is preferably operated at low-power, low-speed, for gentle warm currents, not high-velocity air currents which chill the occupants. If no auxiliary heat can be obtained, for auxiliary heat in a blizzard or other emergency, then one Zone can be heated and another left unheated.

Auxiliary heat can be supplied in various ways as described in prior Thomason patents and patent applications. In the present invention it can be supplied by Coils B and C with heat being pumped from outside Coil A (37) by compressor 36. Alternatively Coil A may be shut off and compressor 36 then pumps heat from Coil B to Coil C. Air is circulated through cold Coil B, where it is chilled, to container 11 where it picks up heat and becomes warm while chilling the contents of container 11, and back through bypass 34 to Coil B. Air is also circulated through hot Coil C, where it is warmed, thence to storage container 12 for storage and to outlet 32 for warming the living quarters. (If quick heat is desired a bypass line, as described above, could be used to deliver the heat directly from blower 28 to outlet 32 to the living quarters.) Similarly, as to the modification of FIG. 3, heat can be picked up at Coil B and pumped to Coil C by compressor 36. In each case heat is being transferred from the low temperature level container 11 to the higher temperature level container 12. That leaves container 11 and tank 13 cooler and consequently capable of absorbing more solar heat when the liquid is pumped from 13 to heat collector 17a. And, the temperature level in container 13 is higher, thereby providing warmer heat for the home and reducing the number of minutes per hour that the circulating blower needs to operate.

2. FULL SUMMER COOLING

Set dampers 29 and 33 in position C. The solar heat collector and pump 23 may be shut down during the hot summer weather. The air conditioning compressor 36, condenser coil 37 (A), and evaporator coils 27, 27' (B and C), preferably with both being used to produce cold, may be used at any time of the day. However, they are preferably operated at night. They chill and dry the air, stones 15, and tanks 13 and 14. The chilled dried stones then absorb excess heat and humidity to keep the home cool and dry on hot humid days. And, the compressor is more efficient in discharging heat on cool nights instead of hot days. Coil A runs cooler and coils B and C run colder, thereby wringing more moisture out of the air, while also extracting more heat, thereby saving energy to produce a greater chilling and drying effect. Blower 28 is preferably operated at high speed so that the air is blown at greater velocity to cool the occupants of the home. If desired damper 33 may be set in position A during the daytime to cool Zone 1 and position B at night to cool Zone 2. Since all of the air is being circulated to only one Zone, that further increases the air velocity in the Zone that is being cooled and the higher velocity air feels cooler to the occupants. Further, cooling power is not wasted in cooling uninhabited Zone B, (bedrooms) during the day, or Zone A (living room, etc.) at night. If desired damper 35 may be opened when the home is cool enough to bypass air back to cooling coils 27, 27' (B and C) for further cooling and dehumidification of the air and storage materials. For unusual conditions one Zone could be cooled and another left uncooled. In FIG. 3 coils B and C (27a and 27b) preferably both operate as cooling coils during full summer cooling periods.

3. SPRING/AUTUMN, ALTERNATE HEATING-COOLING

Set valve 20 to draw water from line 19 and tank 14 only. Thus only tank 14 and the stones in compartment 12 are warmed. Set damper 29 in position B so that the air conditioning unit and coil 27 cool the stones and tank 13 in compartment 11. Bypass damper 35 may be opened to store additional coolness in compartment 11 when little or no cooling of the home is desired. (With damper 35 open most of the air from blower 28 will be bypassed from the slightly higher pressure at the top of compartment 11 to the low pressure at suction line 25 leading to blower 28.) After compartment 12 is "charged" with heat and compartment 11 is charged with coldness and dryness, then either heating or cooling may be obtained as needed. On a hot afternoon damper 29 is set in positon B, a thermostat starts blower 28, and damper 33 is set to cool Zone 1, or Zone 2, or both, as desired. During a chilly night damper 29 is set in position A, a thermostat starts blower 28, and damper 33 is set to warm Zone 1, or Zone 2, or both, as desired.

Compartments 11 and 12 may be charged with heat, cold and dryness in another manner if desired, substantially as described above with regard to Full Winter Heating. Compressor 36 chills coil B while heating coil C. Cold air from coil B chills storage materials in container 11 while warm air from coil C warms storage materials in container 12. The stored heat and cold are then available for either cold snaps or hot spells out-of-season. (In FIG. 3 coils B and C cool and heat tanks 13 and 14, and the contents of containers 11 and 12, to store cold and heat.)

Other forms of the invention may be used. As one example, two smaller blowers may be used instead of the one illustrated. Damper 29 could then be eliminated. One small blower would circulate air from duct 25 to storage bin 11 and out through duct 31. The other would circulate air from duct 25 to storage bin 12 and out through duct 30. Then, during autumn and springtime changeable weather one blower may be used for heating and the other for cooling. During summer or winter both blowers may be used, at low or high speed as desired. A furnace with a blower may be used for auxiliary heat during long cloudy periods. That blower may be used as one of the blowers to achieve the method of operation just described. (However, Applicants teach how to eliminate the furnace entirely in other documents, for example, application Ser. No. 398,323, filed Sep. 18, 1973.)

If no Zone control were desired than damper 32 could be eliminated. Or, two small blowers could be used for Zone control, one to draw from duct 30 and deliver to Zone 1, the other to draw from duct 31 and deliver to Zone 2. Either or both blowers could be of the variable speed type to provide higher or lower flow rates as desired.

As another variation of operation, heat may be stored and used at two levels. Bin 11 may supply heat as needed until it is substantially exhausted while bin 12 is held in reserve at high temperature. If cloudines persits, with no replenishing of the heat supply from solar heat, then the heat from bin 12 may be used. On the other hand, after a cloudy spell most of the heat has been used fom bin 11 and it is very cool. If desired heat pump 36 can pump additional heat from container 11 to container 12, for added heat in 12 while cooling container 11 and the water in tank 13. Either way, when the sun comes out, the cool water from tank 13 in bin 11 is circulated to the solar heat collector. This low-temperature water is easily heated even in early morning, late afternoon, or in hazy semi-cloudy weather with the solar heat collector operating at high efficiency. The solar heated water returns to tank 14 in bin 12 at high temperature. (Of course it could be returned to tank 13 in bin 11 if desired.) This method of operation results in overall high efficiency of the system.

The low temperature level bin 11 and tank 13 could be replaced by a swimming pool or other apparatus which needs heat at a low temperature level. The pool can be heated in morning, afternoons, and during bright cloudy weather, etc. when solar heat is available but at a low temperature level only. The high temperature heat may be stored in a container as at 12, 14 for home or space heating.

As still another variation of operation, instead of flowing the water through tanks 13 and 14 in tandem, a valve or valves may be used at 20 which permit water to be withdrawn from tanks 13 and 14 simultaneously and the solar heated water may flow back to both tanks simultaneously.

Although the invention has been described as utilizing air flow for transporting heat or cold from storage to the area to be heated or cooled it will be obvious that other fluids could be used, such as brine solution, the Freons or other. Nevertheless the Thomasons have found that use of air has advantages such as eliminating radiators or baseboard heaters in the home, obtaining higher efficiency of heat transfer from storage to the home (and from the home to storage during hot summer weather), avoiding possible freezeups of radiators during a cold snap when the home is not occupied, and so on.

We claim:

1. Heat or cold storage apparatus comprising a storage bin having multiple compartments, means to direct warm liquid into each of said compartments when maximum heat storage capacity is needed, or to a first of said compartments when less than maximum heat storage capacity is needed, a second of said compartments being left available for cool storage, means to direct air through said bin in heat exchange relationship with said compartments to heat the air as it passes through a warm compartment or to cool the air as it passes through a cool compartment, means for warming the liquid in one or more compartments for heat storage, and means for cooling one or more compartments for cool storage.

2. Apparatus as in claim 1 wherein said means for warming includes a solar heat collector.

3. Apparatus as in claim 1 wherein said means for warming and means for cooling includes means for extracting heat from one compartment and transferring it to another compartment.

4. Apparatus as in claim 3 wherein said means for warming and means for cooling includes means for extracting heat from a source outside of said storage bin and transferring it inside of one compartment.

5. Apparatus as in claim 4 wherein said means for warming and means for cooling includes means for extracting heat from a source outside of said storage bin and transferring it inside of two compartments.

6. Apparatus as in claim 3 wherein said means for warming and means for cooling includes means for extracting cold from a source outside of said storage bin and transferring it inside of one compartment.

7. Apparatus as in claim 3 wherein said means for warming and means for cooling includes means for extracting cold from a source outside of said storage bin and transferring it inside of two compartments.

8. Apparatus as in any one of claim 1 wherein said means for cooling includes means for circulating a fluid to said storage bin and means in the path of flow of said fluid to cool said fluid.

9. Apparatus as in any one of claim 1 wherein said means for cooling includes a liquid container and means to directly cool said container.

10. Apparatus as in claim 3 wherein said means for warming and means for cooling includes liquid containers and means to directly extract heat from one compartment and transfer it to another compartment.

11. Apparatus as in claim 1 wherein said means for warming includes means for circulating a fluid to said storage bin, and means in the path of flow of said fluid to warm said fluid.

12. Apparatus as in claim 1 wherein said means for warming includes a liquid container, and means to directly warm said container.

* * * * *